United States Patent
Agata et al.

(10) Patent No.: US 6,816,371 B2
(45) Date of Patent: Nov. 9, 2004

(54) METHOD AND ARRANGEMENT FOR ENHANCING THE COOLING CAPACITY OF PORTABLE COMPUTERS

(75) Inventors: Hiroaki Agata, Yokohama (JP); Tarek J. Jamal-Eddine, White Plains, NY (US); Lawrence S. Mok, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 10/320,180

(22) Filed: Dec. 16, 2002

(65) Prior Publication Data

US 2004/0114322 A1 Jun. 17, 2004

(51) Int. Cl.$^7$ ................................. H05K 7/20
(52) U.S. Cl. ................. 361/687; 361/689; 361/695; 165/121; 454/184
(58) Field of Search ................. 361/684–687, 361/689–692, 695, 707–722; 165/80.2, 185, 104.33; 174/15.2, 35 R, 15.1, 16.1; 257/707–726; 62/259.2; 349/59

(56) References Cited

U.S. PATENT DOCUMENTS

| | | | | |
|---|---|---|---|---|
| 5,313,362 A | * | 5/1994 | Hatada et al. | 361/709 |
| 5,606,341 A | * | 2/1997 | Aguilera | 345/87 |
| 5,982,617 A | | 11/1999 | Haley et al. | |
| 6,069,791 A | * | 5/2000 | Goto et al. | 361/687 |
| 6,181,555 B1 | | 1/2001 | Haley et al. | |
| 6,212,069 B1 | | 4/2001 | Janik et al. | |
| 6,226,180 B1 | * | 5/2001 | Ueda et al. | 361/689 |

FOREIGN PATENT DOCUMENTS

| | | | | |
|---|---|---|---|---|
| JP | 410254583 A | * | 9/1998 | G06F/1/20 |
| JP | 411202978 A | * | 7/1999 | G06F/1/20 |
| JP | 02000277963 A | * | 10/2000 | H05K/7/20 |
| JP | 02001345588 A | * | 12/2001 | H05K/7/20 |

OTHER PUBLICATIONS

RD 442130A, Feb. 2001, RD.*

* cited by examiner

Primary Examiner—Michael Datskovskiy
(74) Attorney, Agent, or Firm—Scully, Scott, Murphy & Presser; Daniel P. Morris

(57) ABSTRACT

An arrangement and method for enhancing the cooling capacity of portable personal computers. More particularly, disclosed is the provision of an arrangement for increasing the cooling capacity of laptop computers which are constrained in size, weight and power consumption, through which transfers and dissipates heat from semiconductor chips located in the computer and which are to be cooled, to the rear side of a liquid-crystal display of the laptop computer.

30 Claims, 5 Drawing Sheets

METHOD AND ARRANGEMENT FOR ENHANCING THE COOLING CAPACITY OF PORTABLE COMPUTERS

BACKGROUND OF THE INVENTION

1. Field of the Invention

The present application relates to an arrangement and method for enhancing the cooling capacity of portable personal computers. More particularly, the invention is directed to the provision of an arrangement for increasing the cooling capacity of laptop computers which are constrained in size, weight and power consumption, through which transfers and dissipates heat from semiconductor chips located in the computer and which are to be cooled, to the rear side of a liquid-crystal display of the laptop computer.

The capacity and performance of portable personal computers, such as laptop computers, notebook computers or the like, has recently been enhanced to such an extent that; for example, since the beginning of 1996, the thermal dissipation requirements of portable personal computers (PCs) have increased from about 10 watts to presently about 50 watts and potentially even higher values. This increase in the thermal dissipation requirements is a result of ever increasing CPU performance and additional functionality; such as DVD, modem, audio and the like, which are provided by future PCs. As elucidated in an article by Albert Yu, AThe Future of Microprocessors@, IEEE Micro, December 1996, pages 46 through 53, the trend of increasing power dissipation in the form of heat for portable personal computers will continue in the foreseeable future. Thus, at the widely employed A4 form factor for a portable personal computer; for instance, the cooling limit for a portable PC without a cooling fan is currently in excess of 20 watts and possibly up to 50 watts. Thus, providing a greater cooling capacity than the current limits in order to meet the anticipated thermal dissipation requirements of future portable personal computers, represents not only a potential competitive advantage in industry, but also provides a significant product differentiation from currently available and commercially sold portable personal computers.

In essence, as set forth hereinabove, the power consumption of laptop computers, especially the power of the CPU is continually increasing in the computer technology. Thus, for instance, the total power of a laptop computer is usually above 10 watts and has now increased to the range of about 30 to 50 watts or higher, whereas CPU power has increased from about 3 to 6 watts and, conceivably, can be as high as in the 40 watts range. Most of this power will eventually be dissipated in the form of heat to the surroundings. Consequently, being able to disperse increased amounts of heat from the laptop computer becomes a critical factor in the design and commercial aspects of laptop computers. This may be accomplished through the incorporating into the computers of not only passive heat dissipating or heat sink structures such as fins, heat pipes, or the like, but also of active heat transfer devices, possibly in the form of fans and similar features.

2. Discussion of the Prior Art

Various arrangements and devices for increasing the cooling capacities of laptop or personal computers are currently known in the technology.

Janik et al. U.S. Pat. No. 6,212,069 B1 discloses a thermally efficient portable computer wherein electronics are mounted on the display side of the portable computer having two separate plates, one for electronics and one for the display. The two plates can be brought into contact when the portable computer is closed and wherein the heat spreader comprises a separate component from an insulating rear cover closer to a display module when the portable computer is not in use, and for moving the heat spreader and insulating rear cover a distance away from the display module during use of the portable computer. This enables the spreading of the heat and efficient cooling of the heat spreader, however, is not concerned with transferring and dissipating heat from a CPU located in the main box of the computer.

Haley et al. U.S. Pat. No. 6,181,555 B1 discloses a cooling system for integrated circuit chips arranged in a portable computer wherein a lid having integrated circuit components requiring heat dissipation is provided with a flexible expansion structure under the action of a spring providing for passageways in order to enable the flow of cooling air between a module and display assembly.

Goto et al. U.S. Pat. No. 6,069,791 discloses a cooling device for notebook personal computers, wherein a flow passageway for cooling medium is located rearwardly of a liquid crystal display in the cover portion of the personal computer. This construction facilitates the transfer of heat from the main box of the computer to a display side in which a heat sink is positioned within a cavity rearwardly of the liquid crystal display, and wherein air is permitted flow within the cavity around the heat sink to effectuate heat dissipation.

Haley et al. U.S. Pat. No. 5,982,617 discloses an arrangement for cooling the electronics which are arranged in a separate structure rearwardly above a liquid crystal display panel, and wherein flow of air is adapted to pass intermediate initially spaced components.

SUMMARY OF THE INVENTION

Although the foregoing personal computer or laptop computer constructions each provide various types of methods to enable the heat transfer and dissipation thereof from electronic components, such as from computer chips or CPUs arranged within a personal computer, the present invention is directed to an improved arrangement and method of dissipating heat for essentially conventional portable computers in which most of the heat generating components, such as the CPU (central processing unit) are located in the main box, and wherein heat is transferred to a display component such as a cover hingedly connected to the main box and mounting the liquid crystal display. Moreover, the inventive arrangements for causing the heat to be transferred from the CPU and dissipated are unlike the prior art and provide for an expedient and highly efficient method of dissipating the generated heat.

Pursuant to a first embodiment of the invention, a thermal hinge interconnecting the main box housing the CPU and the cover housing the display is employed to conduct a portion of the heat generated by the central processing unit (CPU) to heat spreaders located rearwardly of the liquid crystal display, and wherein generally flexible bellows-shaped air duct is connected between the outlet of a cooling fan located proximate the CPU to the inlet of a channel defined by two spaced heat spreaders rearwardly of the display. Air is forced into the channel from the bottom of the cover towards top edge of the cover housing the display, in that the fan is adapted to draw heated air away from the electronics or CPU into the air duct and into the channel formed by the heat spreaders so as to be conducted to the surroundings.

Pursuant to a modified embodiment of the invention, the heated air generated by the electronics or CPU in the main box structure of the computer is conducted rearwardly by the action of the fan and diverted into a free space externally of the main box and rearwardly of the display cover mounting the liquid crystal display, wherein self-retractable air diverter means is employed to maintain the airflow close to the outer surface of the display cover.

Accordingly, it is an object of the present invention to provide a portable device, such as a portable personal computer or the like, wherein improved cooling of the electronics contained in a main box is effected by an air stream emanating from a fan located proximate the CPU to cause the air to flow through a thermal hinge into a channel between heat spreaders rearwardly of a liquid crystal display housed in a cover portion which is hingedly connected to the main box.

Pursuant to another object of the invention, the air flow is directed from the fan through a flexible bellows type thermal hinge interconnecting the cover portion mounting the liquid crystal display, and the main box housing the heat-generating electronic components, is directed therefrom into a heat spreading channel extending between heat spreaders rearwardly of the liquid crystal display and the cover of the portable computer so as to be conducted to the surroundings.

In accordance with another object of the invention, the flow of air emanating from the main box containing the electronic components or CPU is directed into a free space rearwardly of the cover housing the liquid crystal display, and a mechanism adapted to open and close an air diverter automatically responsive to opening and closing of the display cover is provided to enable the heated airflow to discharge into the surrounding rearwardly of the computer cover.

BRIEF DESCRIPTION OF THE ACCOMPANYING DRAWINGS

Reference may now be made to the following detailed description of preferred embodiments of the invention, taken in conjunction with the accompanying drawings; in which.

DETAILED DESCRIPTION OF PREFERRED EMBODIMENTS

Figure 1:
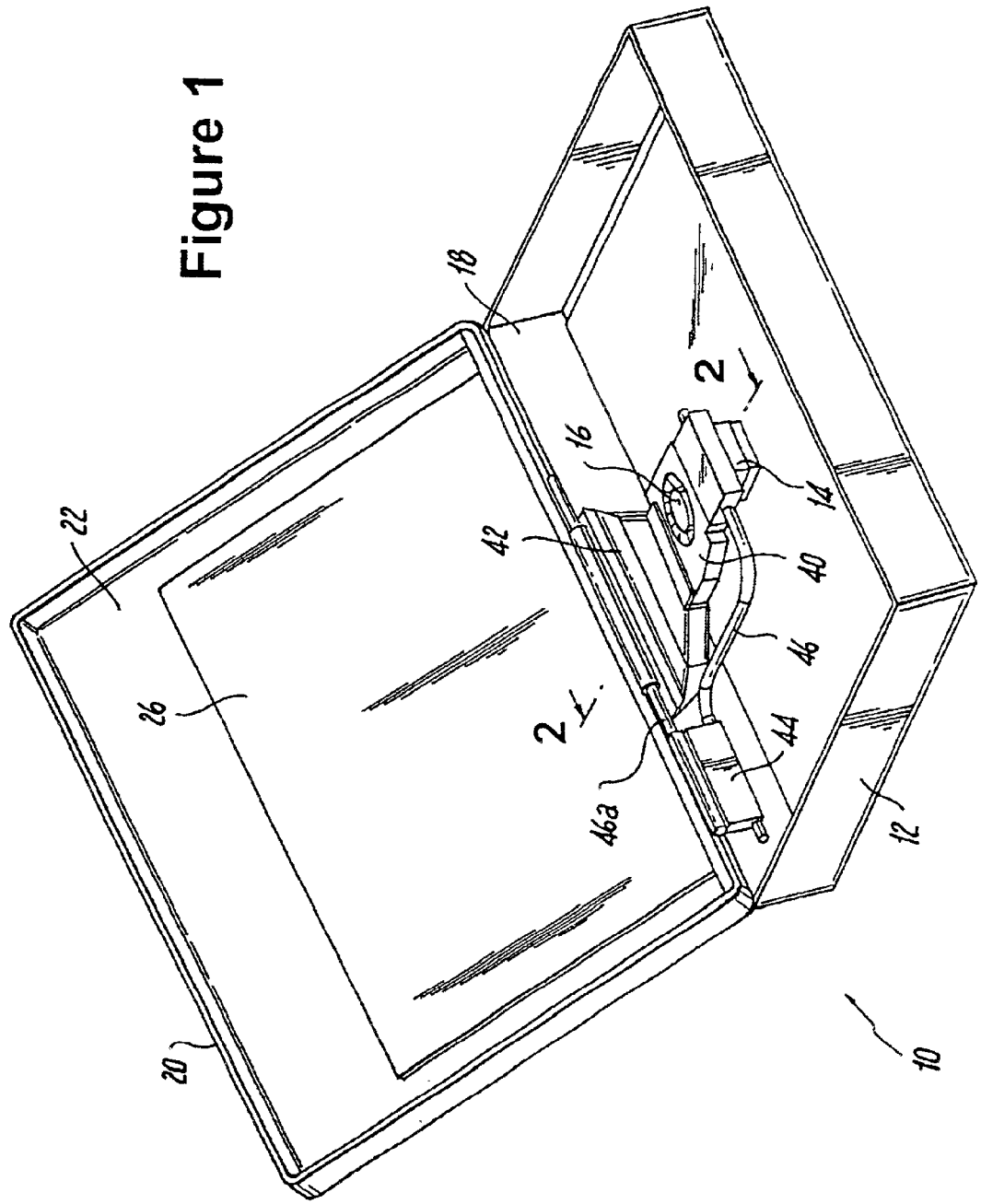
FIG. 1 illustrates a perspective representation of a portable computer, such as a laptop computer, shown in an open operative condition providing a novel cooling arrangement for air conducted from a fan cooling electronics in a main box into a passageway or channel intermediate two heat spreaders arranged rearwardly of a liquid crystal display in the cover which is hinged to the main box.
Figure 2:
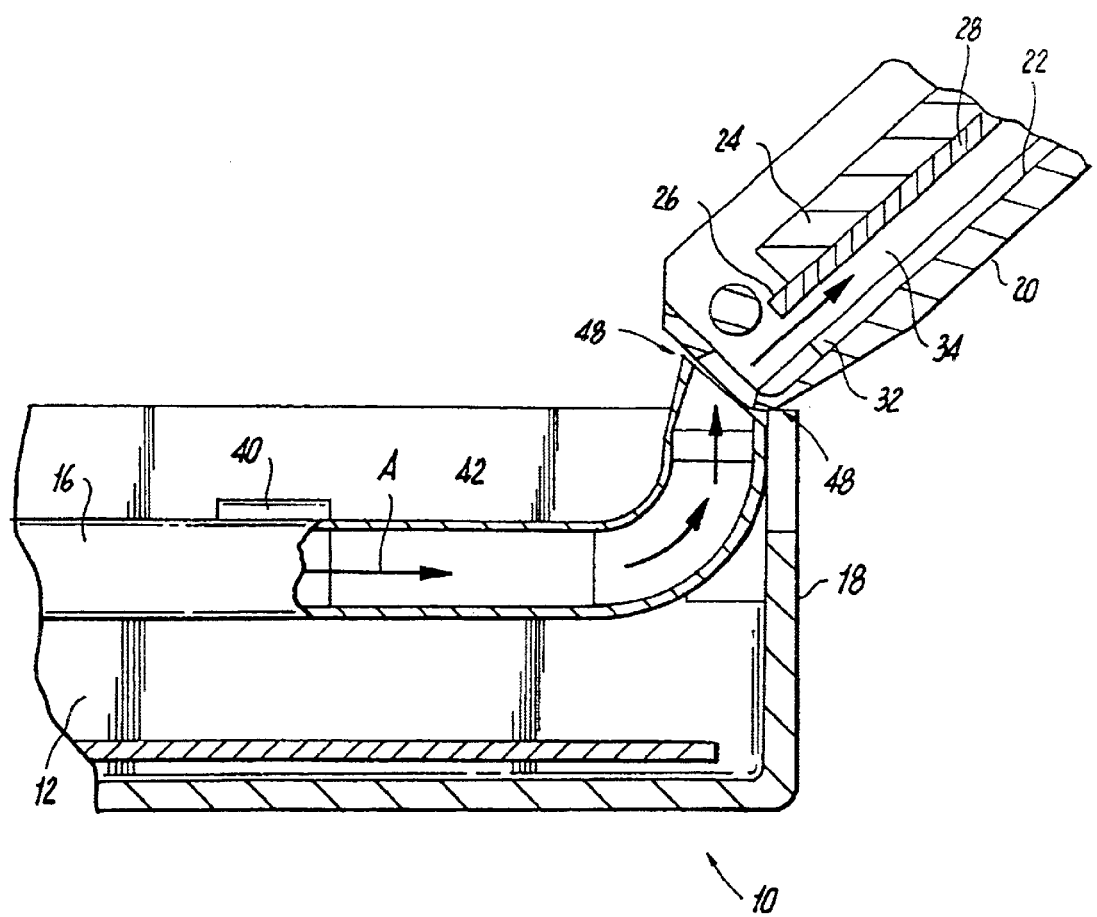
FIG. 2 illustrates, on an enlarged scale, a fragmentary portion of a heat dissipating and transfer arrangement, taken along line 2—2 in FIG. 1.

Referring in specific detail to the embodiment of FIGS. 1 and 2 of the drawings, there is illustrated a laptop computer 10 which comprises a main box structure 12 housing electronic components, such as a CPU (central processing unit) 14 of the computer. Arranged on top of a semiconductor chip which generally comprises the CPU 14 and which represents is the primary source of the generation of heat during the operation of the computer 10 is a cooling fan assembly 40 containing fan 16.

In a hinged construction, connected to the rear upper edge 18 of the main box 12 of the computer 10 is a cover 20 which comprises a rectangular member and wherein the interior surface 22 thereof where a liquid crystal display (not shown in FIG. 1) will be placed.

Referring to FIG. 2, rearwardly of the liquid crystal display 24 there is located at least one heat spreader 26, which may be in the form of a plate mounting the liquid crystal display 24, and between which there may be provided a layer of a thermal insulating material 28 so as to prevent any heat or warming aspect of the heat spreader 26 from being conducted to the liquid crystal display 24.

Pursuant to the present invention, spaced from the rear surface of the heat spreader plate 26 may be a second heat spreader 32 in the form of a plate which is adhesively fastened to the inner surface 22 of the cover 20 in good thermal contact therewith, in parallel with first heat spreader 26 providing a narrow passageway or channel 34 between the heat spreaders 26, 32 and extending along the full height of the cover while being opened at generally both upper and lower ends thereof.

The computer 10 has main box 12 containing most semiconductor chips and their associated electronics parts forming CPU 14, which are not shown in detail for the purpose of clear illustration of the novel cooling mechanism. Fan assembly 16 is placed on top of the main heat-generating semiconductor chip, which is typically the Central-Processing Unit (CPU) 14 of the computer whereby the outlet of the fan of assembly 16 is connected to an air duct 42. A portion of the heat generated from the CPU is carried by the air from the fan assembly, and another portion of the heat is transferred to a thermal hinge 44 via a heat pipe 46 which is mounted between the fan 160 and the thermal hinge 44. Another heat pipe 46a is mounted proximate the bottom of the display cover 20 so as to carry the heat from the thermal hinge 44 to the heat spreaders 26 and 32. Both heat spreader plates 26, 32 preferably are made of thermally conductive materials such as aluminum, copper, or graphite fiber composite, and form the air channel 34 between the computer display 24 and display cover 20. The distance between these two heat spreaders is 0.5 to 10 mm to form the air channel 34. Alternatively, the air channel can be formed by a rectangular duct with a high aspect ratio, of which all four walls are made of thermally conductive materials. The arrows A in FIG. 2 define the airflow path from the fan 16 through the air duct 42, across a gap 48 between the air duct 42 and the display cover 20, and to the channel 34 between the two heat spreader plates 26 and 32. The air duct 42 is tapered such that the output end of the air duct is wider than the input end and is preferably formed by flexible bellows type wall structure such that its output end is pressed against the inlet to channel 34 between the heat spreader. The mechanical fixture to ensure the air duct output end facing the channel 34 is not shown in the drawing. The air will exit from the channel 34 at the other end of the display cover 20, whereby grills may be provided which are not shown in the drawings.

Alternatively, pursuant to a modification, in lieu of the two spaced heat spreader plates 26 and 32, the channel or passageway 34 may be formed by only the first heat spreader plate supporting the liquid crystal display 24, and by the interior wall surface 22 of the cover 20, thereby eliminating the second heat spreader plate 32 shown in FIG. 2 of the drawings.

Figure 3:
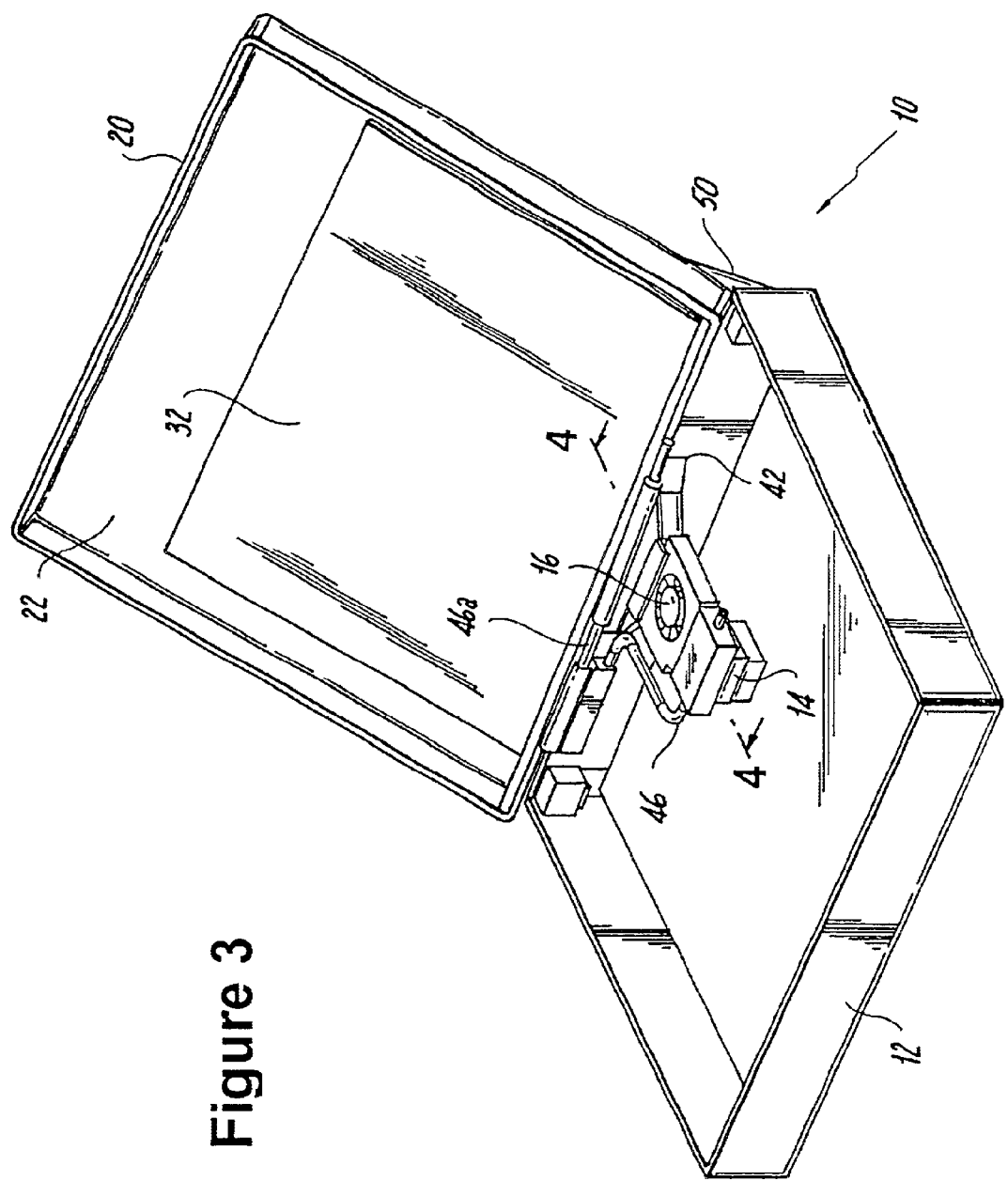
FIG. 3 illustrates a perspective representation of a modified cooling mechanism for a laptop computer with an automated air diverter.
Figure 4:
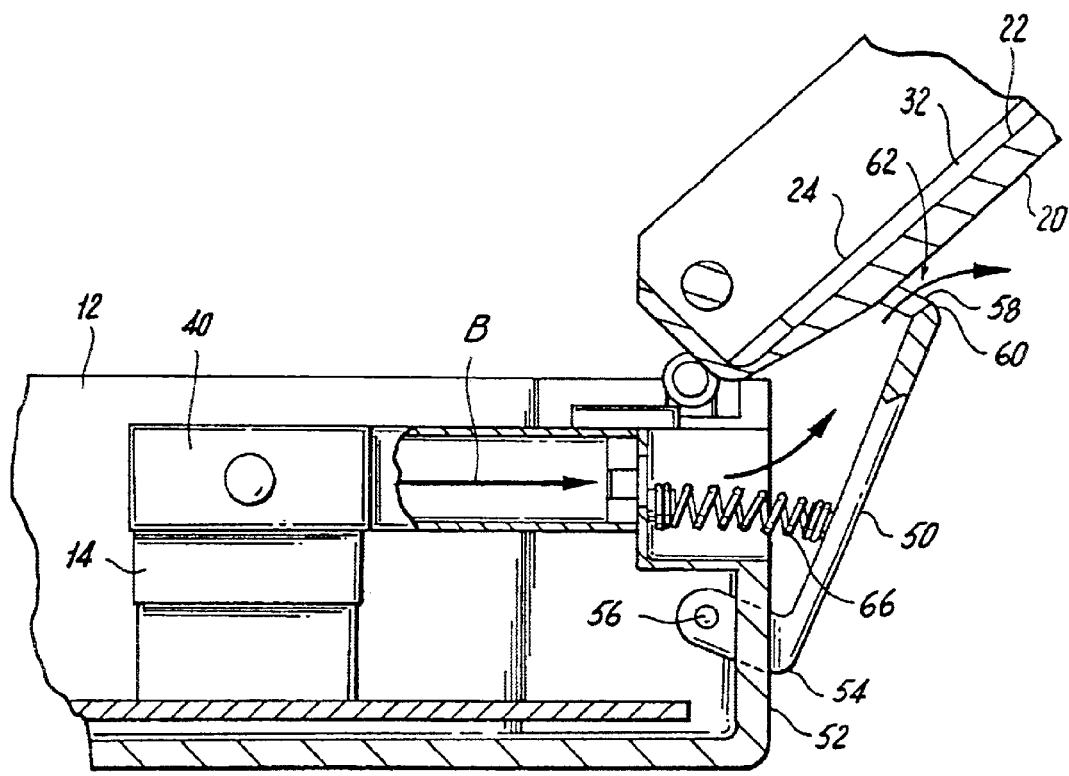
FIG. 4 illustrates, on an enlarged scale, a fragmentary view taken along line 4—4 in FIG. 3.
Figure 5:
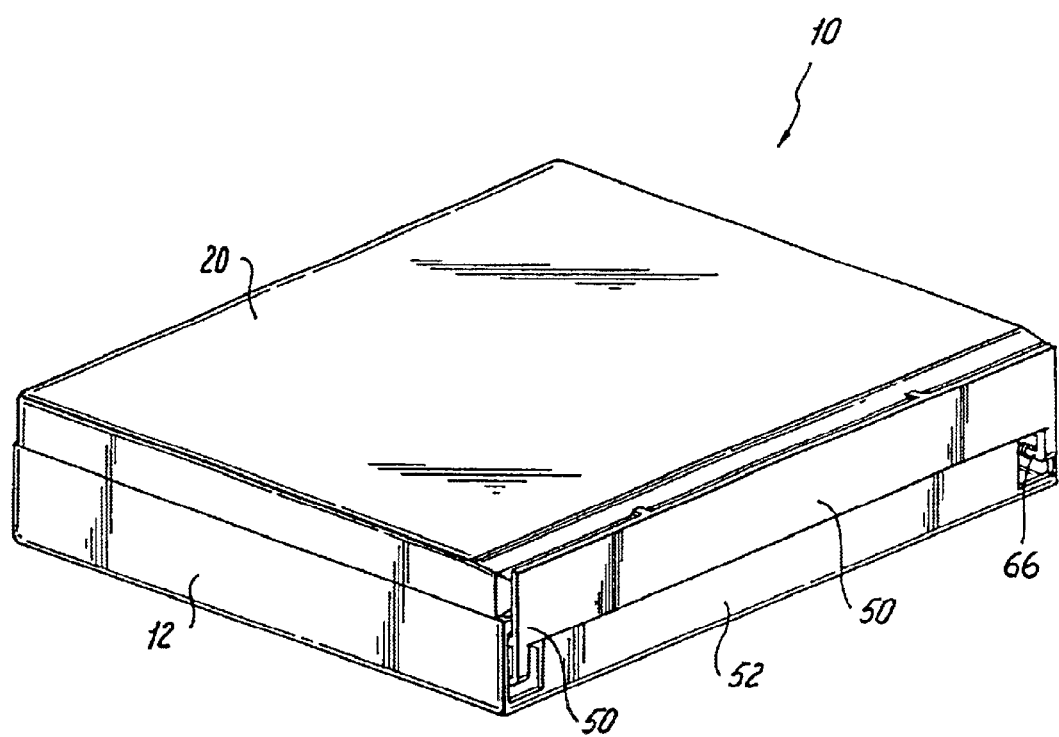
FIG. 5 illustrates, in a perspective representation, the laptop computer of FIG. 3 shown in the closed position thereof.

Pursuant to the embodiment of FIGS. 3 through 5, wherein similar or identical parts as in the preceding embodiment are identified by the same reference numerals, the air is blown out beyond the rear of the cover 20, whereby the heat spreader plate 26 has been eliminated, as described hereinbelow.

In this embodiment, the air is blown out to the rear side of the main box 12 from the fan 16. An air diverter 50 is placed outside the rear end wall 52 of the computer main box 12, and the bottom edge 54 thereof is anchored inside the main box using a pivot 56 which is shown in FIG. 4 of the drawing. The air diverter 50 can be rotated about this pivot 56 during the opening and closing of the display cover 20. Referring specifically to FIG. 4, there are provided several standoffs 58 at the upper edge 60 of the air diverter 50 so as to ensure the forming of a clearance 62 between the air diverter 50 and the outer surface of the display cover 20. Several extension-type of springs 66 may be employed to pull the air diverter 50 against the display cover 20. Thus, when the display cover 20 is in the closed position, the springs 66 will pull the air diverter 50 back into contact with the main box rear wall 52 as shown in FIG. 5. However, other type of springs such as a torsion type can also be readily used for this purpose. The arrows B in FIG. 4 illustrate the typical air flow pattern encountered when the display cover 20 is in an open position. Referring to FIG. 3, as in the embodiment of FIGS. 1 and 2, a heat pipe 46 is connected between the fan 16 and the thermal hinge 44 which is placed at the inner side of the rear wall of the computer main box 12. Another heat pipe 46a is used to connect the thermal hinge 44 to a heat spreader 32 which is mounted to the inner surface 22 of the display cover 20 using adhesives so as to ensure a good thermal contact with the display cover 20.

From the foregoing it becomes readily apparent that the various embodiments which incorporate the different methods and arrangements for the improved heat dissipation provide for an inexpensive and superior type of heat transfer from the electronics or heat generating components in a computer to the surroundings.

While the invention has been particularly shown and described with respect to preferred embodiments thereof, it will be understood by those skilled in the art that the foregoing and other changes in form and details may be made therein without departing from the spirit and scope of the invention.

What is claimed is:

1. An arrangement for enhancing the cooling capacity of a portable computer having a housing containing at least one electronic component generating heat during the operation of said computer, and a cover for said housing containing a display panel being hingedly connected to said housing proximate a rear edge thereof; said arrangement comprising:
    a fan assembly in said housing located proximate said at least one electronic component communicating with a thermal hinge between said housing and cover through a heat pipe for drawing at least a portion of heated air away from said at least one electronic component; and
    a heat sink structure being mounted in said cover behind said display panel;
    an air duct communicating said fan assembly with said heat sink structure for drawing a further portion of heated air away from said at least one electronic component, whereby said heated air portions are dissipated into the surroundings.

2. An arrangement as claimed in claim 1, wherein said heat sink structure in said cover comprises a first heat spreader having said display panel mounted on one surface thereof, and optionally a second heat spreader extending in spaced relationship with the opposite surface of said first heat spreader and being fastened in an inner wall surface of said cover so as to define a channel between said heat spreaders for the passage of air received from said air duct.

3. An arrangement as claimed in claim 2, wherein said air duct comprises a flexible, bellows-type member extending between an outlet from said fan assembly and an inlet to said channel between said heat spreader.

4. An arrangement as claimed in claim 3, wherein said air duct tapers from a narrower inlet at said fan assembly to a wider discharge end at the connection with said panel.

5. An arrangement as claimed in claim 2, wherein said heat sink structure is constituted of a thermally conductive material selected from the group of materials consisting of aluminum, copper or a graphite fiber composite.

6. An arrangement as claimed in claim 2, wherein each said heat spreader comprises a plate member, said channel defining a passageway with a distance of about 0.5 to 10 mm between said plate members.

7. An arrangement as claimed in claim 2, wherein a heat insulating layer is interposed between said display panel and said first heat spreader on which said display panel is mounted.

8. An arrangement as claimed in claim 1, wherein said heat sink structure in said cover comprises a plate member mounted in spaced relationship from an inner wall surface of said cover so as to form an air flow passageway therebetween communicating with said air duct for receiving a flaw of heated air therefrom.

9. An arrangement as claimed in claim 1, wherein said heat sink structure comprises a rectangular duct extending along the inner wall surface of said cover, said rectangular duct forming an airflow channel communicating with said air duct for receiving heated air from said fan assembly and dissipating said air to the surroundings.

10. An arrangement for enhancing the cooling capacity of a portable computer having a housing containing at least one electronic component generating heat during the operation of said computer, and a cover for said housing containing a display panel being hingedly connected to said housing proximate a rear edge thereof; said arrangement comprising:
    a fan assembly in said housing located proximate said at least one electronic component communicating with a thermal hinge between said housing and cover through a heat pipe for drawing at least a portion of heated air away from said at least one electronic component;
    an air diverter structure mounted at the rear edge of said housing; and an air duct communicating said fan assembly with said air diverter structure for drawing a further portion of heated air away from said at least one electronic component towards the external surface of said cover whereby said heated air portions are dissipated into the surroundings.

11. An arrangement as claimed in claim 10, wherein said air diverter structure has a lower end pivotably connected to said housing, and an upper edge formed with standoffs facing said cover.

12. An arrangement as claimed in claim 11, wherein said standoffs provide an open space between said cover and said air diverter structure in the open position of said cover to enable an airflow to pass therebetween into the surroundings along the external cover surface.

13. An arrangement as claimed in claim 10, wherein spring means bias said air diverter structure towards said cover.

14. An arrangement as claimed in claim 13, wherein said spring means selectively comprise tension or torsion springs.

15. An arrangement as claimed in claim 10, wherein said air diverter means is automatically operated by respectively the opening or closing of said cover on said housing.

16. A method of enhancing the cooling capacity of a portable computer having a housing containing at least one electronic component generating heat during the operation of said computer, and a cover for said housing containing a display panel being hingedly connected to said housing proximate a rear edge thereof; said method comprising:
　　locating a fan assembly in said housing proximate said at least one electronic component communicating with a thermal hinge between said housing and cover through a heat pipe for drawing at least a portion of heated air away from said at least one electronic component;
　　mounting a heat sink structure in said cover behind said display panel; and
　　providing an air duct for communicating said fan assembly with said heat sink structure for drawing a further portion of heated air away from said at least one electronic component, whereby said heated air portions are dissipated into the surroundings.

17. A method as claimed in claim 16, wherein said heat sink structure in said cover comprises a first heat spreader having said display panel mounted on one surface thereof, and optionally a second heat spreader extending in spaced relationship with the opposite surface of said first heat spreader and being fastened in an inner wall surface of said cover so as to define a channel between said heat spreaders for the passage of air received from said air duct.

18. A method as claimed in claim 17, wherein said air duct comprises a flexible, bellows-type member extending between an outlet from said fan assembly and an inlet to said channel between said heat spreader.

19. A method as claimed in claim 18, wherein said air duct tapers from a narrower inlet at said fan assembly to a wider discharge end at the connection with said panel.

20. A method as claimed in claim 17, wherein said heat sink structure is constituted of a thermally conductive material selected from the group of materials consisting of aluminum, copper or a graphite fiber composite.

21. A method as claimed in claim 17, wherein each said heat spreader comprises a plate member, said channel defining a passageway with a distance of about 0.5 to 10 mm between said plate members.

22. A method as claimed in claim 17, wherein a heat insulating layer is interposed between said display panel and said first heat spreader on which said display panel is mounted.

23. A method as claimed in claim 16, wherein said heat sink structure in said cover comprises a plate member mounted in spaced relationship from an inner wall surface of said cover so as to form an air flow passageway therebetween communicating with said air duct for receiving a flow of heated air therefrom.

24. A method as claimed in claim 16, wherein said heat sink structure comprises a rectangular duct extending along the inner wall surface of said cover, said rectangular duct forming an airflow channel communicating with said air duct for receiving heated air from said fan assembly and dissipating said air to the surroundings.

25. A method for enhancing the cooling capacity of a portable computer having a housing containing at least one electronic component generating heat during the operation of said computer, and a cover for said housing containing a display panel being hingedly connected to said housing proximate a rear edge thereof; said method comprising:
　　locating a fan assembly in said housing proximate said at least one electronic component communicating with a thermal binge between said housing and cover through a heat pipe for drawing at least a portion of heated air away from said at least one electronic component;
　　mounting an air diverter structure mounted at the rear edge of said housing; and
　　providing an air duct for communicating said fan assembly with said air diverter structure for drawing a further portion of heated air away from said at least one electronic component towards the external surface of said cover whereby said heated air portions are dissipated into the surroundings.

26. A method as claimed in claim 25, wherein said air diverter structure has a lower end pivotably connected to said housing, and an upper edge formed with standoffs facing said cover.

27. A method as claimed in claim 26, wherein said standoffs provide an open space between said cover and said air diverter structure in the open position of said cover to enable an airflow to pass therebetween into the surroundings along the external cover surface.

28. A method as claimed in claim 25, wherein spring means bias said air diverter structure towards said cover.

29. A method as claimed in claim 28, wherein said spring means selectively comprise tension or torsion springs.

30. A method as claimed in claim 25, wherein said air diverter means is automatically operated by respectively the opening or closing of said cover on said housing.

* * * * *

UNITED STATES PATENT AND TRADEMARK OFFICE
CERTIFICATE OF CORRECTION

PATENT NO.    : 6,816,371 B2
DATED         : November 9, 2004
INVENTOR(S)   : Hiroaki Agata et al.

It is certified that error appears in the above-identified patent and that said Letters Patent is hereby corrected as shown below:

<u>Column 8,</u>
Line 23, "binge" should read -- hinge --

Signed and Sealed this

Twenty-fourth Day of May, 2005

JON W. DUDAS
*Director of the United States Patent and Trademark Office*